United States Patent [19]
Khoury et al.

[11] Patent Number: 5,555,128
[45] Date of Patent: Sep. 10, 1996

[54] PHASE CODING TECHNIQUE FOR ONE-WAY IMAGE TRANSMISSION THROUGH AN ABERRATING MEDIUM

[75] Inventors: Jehad Khoury, Concord, N.H.; Charles L. Woods, Stow; Jack Fu, Brighton, both of Mass.

[73] Assignee: The United States of America as represented by the Secretary of the Air Force, Washington, D.C.

[21] Appl. No.: 319,144

[22] Filed: Oct. 4, 1994

[51] Int. Cl.$^6$ .............................. G03H 1/08; G03H 1/16
[52] U.S. Cl. .............................. 359/559; 359/10; 359/16
[58] Field of Search .............................. 359/7, 10, 11, 359/16, 559

[56] References Cited

U.S. PATENT DOCUMENTS

| | | | |
|---|---|---|---|
| 5,028,102 | 7/1991 | Ogura et al. | 359/559 |
| 5,111,515 | 5/1992 | Javidi | 359/559 |
| 5,159,474 | 10/1992 | Franke et al. | 359/559 |
| 5,258,860 | 11/1993 | Schehrer et al. | 359/10 |
| 5,426,521 | 6/1995 | Chen et al. | 359/559 |

*Primary Examiner*—Timothy P. Callahan
*Assistant Examiner*—T. Lam
*Attorney, Agent, or Firm*—Robert L. Nathans

[57] ABSTRACT

An object beam is passed through an aberrating medium to produce a diffraction distorted image therein, which is imaged upon a spatial light modulator. A probe beam measures the phase aberrated wavefront within the aberrating medium and is used to produce an interference pattern which is employed to produce phase encoding signals to be fed back to the spatial light modulator for compensating in part for the phase distortion of the phase aberrated wavefront. The result is an output image having a substantially reduced degree of distortion.

21 Claims, 1 Drawing Sheet

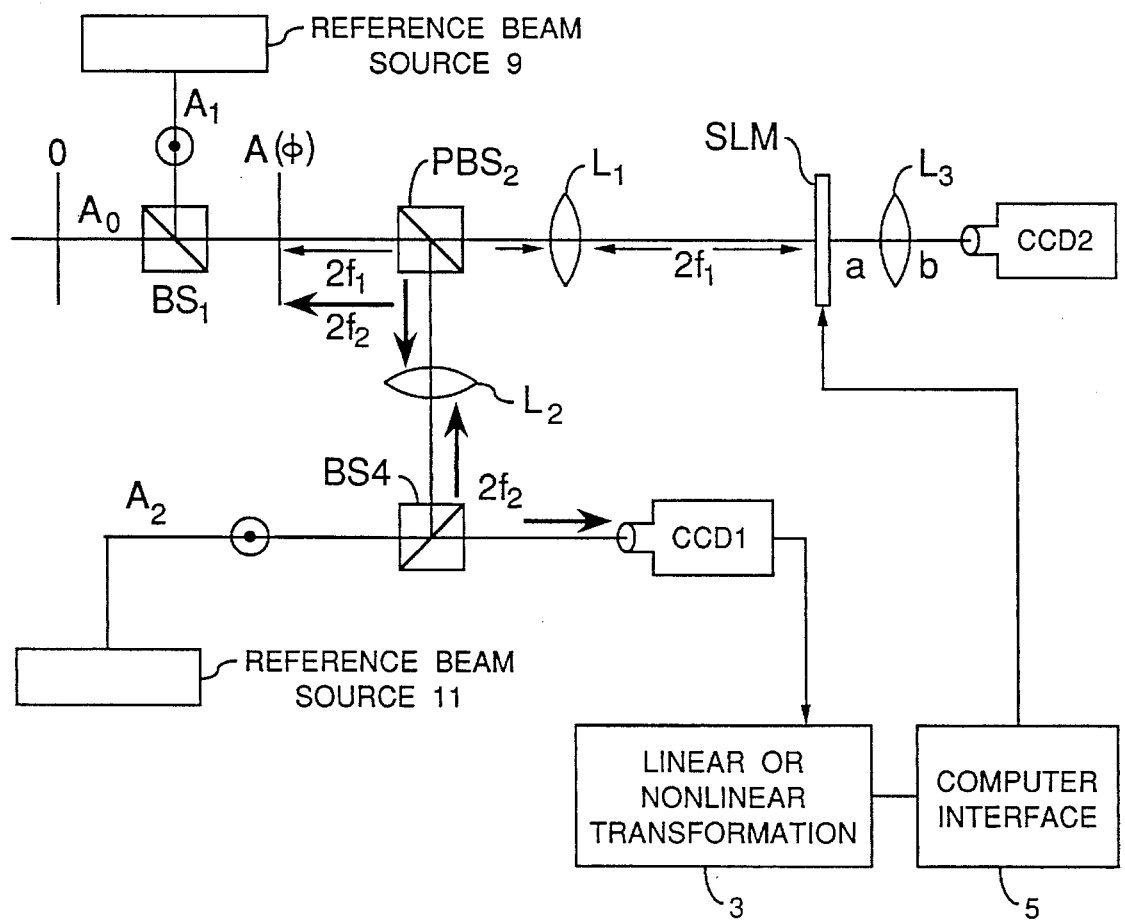

PHASE CODING TECHNIQUE FOR ONE-WAY IMAGE TRANSMISSION THROUGH AN ABERRATING MEDIUM

STATEMENT OF GOVERNMENT INTEREST

The invention described herein may be manufactured and used by or for the Government for governmental purposes without the payment of any royalty thereon.

BACKGROUND OF THE INVENTION

One-way image transmission through an aberrating medium is an application problem as well as an interesting research topic. Many researchers have proposed solutions to this problem. While some solutions relied on either phase conjugate or opto-electronic means, other solutions used a hybrid of optical and electronic technologies. All of these existing techniques rely on correcting the distorted information by the exact phase of the distortion. The choice of spatial light modulators for these techniques is limited to the few available continuous phase devices. On the other hand, phase conjugate techniques suffer from reduced spatial resolution due to the crystal thickness and non-paraxial geometry.

We therefore propose and demonstrate a new analogue feedback SLM technique which eases the requirement of exact phase correction and avoids the use of holographic phase conjugate material. In this technique, we use any of several codings of the phase correction instead of using the exact phase correction. This approach enables us to utilize all of the readily available spatial light modulators for compensators. In addition, we use the interference pattern of a probe beam of orthogonal polarization to directly code the correction, enabling the use of the improving spatial resolutions of current imaging technology. Since we do not use the exact phase information of the distortion function, our results are accompanied with some degree of additive noise. The additive noise in the recovered image depends on the specific implementation and coding of the phase restoration technique.

BRIEF SUMMARY OF THE INVENTION

The opto-electronic technique for one-way image transmission through a thin aberrating medium of the present invention employs a probe beam to measure the phase aberration of the medium by means of an interference process. The measured interference pattern is amplitude or phase coded and fed back to a spatial light modulator in the path of the aberrated image to compensate the phase aberration for the first order correction. This enables the selection and optimization of a restoration code for one-way image correction employing a wider variety of spatial light modulators than previously possible.

BRIEF DESCRIPTION OF THE DRAWING

Other features and advantages of the invention will become apparent upon reading of the following description, taken in conjunction with the drawing in which:

The sole FIGURE illustrates a presently preferred apparatus for one-way image restoration in accordance with the invention.

DETAILED DESCRIPTION OF PREFERRED EMBODIMENTS OF THE INVENTION

The FIGURE shows the proposed transmission system for one way image restoration. The vertically polarized object beam is first amplitude modulated by a spatial amplitude transmittance O, producing an information bearing wavefront, $A_0$. Our computer simulations use a picture of a human face. At the beam splitter $BS_1$, $A_0$ is combined with a plane probe wave $A_1$ of orthogonal (horizontal) polarization produced by reference beam source 9. This probe beam is used to measure the phase aberration $A(\Phi)$ along the path of beam $A_0$.

A polarizing beam splitter $PBS_2$ is used to separate the two orthogonally polarized beams. The object beam is allowed to pass through while the probe beam is reflected to interfere at BS4 with reference beam $A_2$ of horizontal polarization. Second imaging means lens $L_2$ is used to image the aberrator $A(\Phi)$ onto the camera first image sensor or camera CCD1 so that the interference pattern on the camera includes the phase information of the phase aberrator $A(\Phi)$. The correction applied at the spatial light modulator SLM in the path of beam $A_0$ is provided by analyzing this interference pattern. The first imaging means lens $L_1$ was placed at the $2f_1$ position from the SLM and the thin aberrating medium or phase aberrator $A(\phi)$ in order to image the phase aberrator onto the spatial light modulator (SLM). The image now corrected by the SLM can be imaged by lens L3 upon image sensor CCD2. Thus, PBS2 acts as a beam separation means for separating the object beam which is projected upon the image receptor SLM, from the phase aberration measurement probe, enabling the probe to be employed to generate an interference pattern when combined with the reference beam A2 from refrence beam source 11. The resulting pattern is projected upon gray scale image sensor or detector CCD1. The varying intensities of the interference pattern are employed to control the phase encoding signals, in a manner to be explained, which are a function of the light intensities sensed by gray scale light sensor CCD1. These signals are fed to the SLM via computer interface 5 and compensate for part of the phase distortion of the phase aberrated wavefront, as described in further detail herein. The preferred interference pattern generation means can be replaced by phase retardation sensing means for detecting the local wavefront distortions produced by the aberrating media such as by measuring the delay of arrival of the phase or frequency shift in the modulation of the probe wave across the wavefront. Alternatively, a local wavefront sensing means may be provided for detecting the optical path length distortions produced by the aberrating media. One example would be the use of a shearing interferometer for this purpose.

The reference beam A2 for producing the interference pattern may be provided: 1) by propogating a separate beam through a relatively distortion free path, 2) by selection and expansion of a portion of the probe wavefront (such as a spatial filtering), 3) by using contiguous portions of the probe wavefront, 4) by using the output of a local oscillator source with a controlled frequency relative to the probe such as constant or chirped, or 5) by providing similar comparisons of the image wavefront with the probe or of the image wavefront with itself.

We show below that any coding (amplitude, phase or both combined) addressed on the SLM will compensate for the aberration subject to the limitations of the spatial light modulator and the details of the recovery process optimization.

In order to understand the mechanism behind the operation of this device, let us assume that the interference pattern on the CCD1 camera plane is given by $$I_{out} = A_1^2 + A_2^2 + 2A_1A_2 \cos \phi = I_0(1+\gamma \cos \phi) \quad (1)$$

where $$I_0 = |A_1|^2 + |A_2|^2 \quad (2)$$

and $$\gamma = \frac{2|A_1||A_2|}{I_0}$$

For any linear or nonlinear phase coding of this interference pattern, it is possible to analyze the mechanism of our correction techniques by using nonlinear transform methods. Such methods are disclosed in U.S. Pat. No. 5,119,443, issued Jun. 2, 1992 to Bahram Javidi and Joseph Horner, and incorporated by reference herein. See also, Javidi, "Nonlinear joint power spectrum based optical correlation", Applied Optics, vol. 28, no. 12, 15 Jun. 1989.

Let us assume that our coding of the compensation which we apply to the spatial modulator is given by a function $g(I)$. Nonlinear transform methods enable us to analyze $g(I)$ in terms of its fundamental components [9,10]. Defining the Fourier transform of $g(I)$ as, $$G(\omega) = \int_{-\infty}^{\infty} g(I)\exp(-i\omega I)dI \quad (3)$$

and substituting Eq. 1 into Eq. 3, it is possible to prove that $$g(I) = \Sigma H_n\left(\frac{\gamma I_0}{2}\right)\cos(n\phi) \quad (4)$$

where $$H_n\left(\frac{\gamma I_0}{2}\right) = \frac{\epsilon^n}{2\pi}\int_{-\infty}^{\infty} G(\omega)J_n(\gamma\omega I_0)\exp(i\omega I_0)d\omega. \quad (5)$$

From Eqs. 4 and 5, we can observe that any coding of the interference pattern can be analyzed into its fundamental phase component and multiple integer higher order terms. Therefore any linear or nonlinear coding should compensate for part of the phase distortion in the first order approximation.

In our computer simulations, five different coding filters were used to evaluate the performance of different aberration compensation codings from the interference pattern. For the phase distortion $A(\phi)$, we used random phase shifts. This random phase distortion was produced by multiplying a random 256 by 256 complex number array of unit amplitude with the far field pattern (Fourier transform) of a 64 by 64 pixel clean image.

Our restoration filters were based upon the detected intensity interference pattern between the transmission of the aforesaid plane probe wave which also passed through the distorting medium and the aforesaid plane reference wave. We assumed that both the reference and the probe beams have unit amplitudes, producing an interference intensity of $2(1+\cos(\phi))$.

Our coded filters (which are based on direct coding from the interference intensity) are:
1) the binary phase coded or binary phase only filter (BPOF), $$F_{B\phi}(1 + \cos\phi) = BPOF(\phi) \quad (6)$$

$$= \begin{cases} 1, & 1+\cos\phi > 1 \\ -1, & 1+\cos\phi < 1; \end{cases}$$

2) the ternary coded phase and amplitude filter (TPAF), $$F_{T\phi A}(1 + \cos\phi) = TPAF(\phi) \quad (7)$$

$$= \begin{cases} 1, & 1+\cos\phi > 1.5 \\ 0, & 0.5 \leq 1+\cos\phi \leq 1.5 \\ -1, & 1+\cos\phi < .5; \end{cases}$$

3) the amplitude encoded binary phase only filter (AEBPOF), $$F_{AB\phi}(1 + \cos\phi) = AEBPOF(\phi) \quad (8)$$

$$= \begin{cases} 1, & 1+\cos\phi \geq 1 \\ 0, & 1+\cos\phi < 1; \end{cases}$$

4) an amplitude filter coded linearly with the interference pattern, $$F_{AI} = [1+\cos \phi]/2; \quad (9)$$

and 5) a phase filter coded linearly with the interference pattern (a possible but clearly non-optimal coding, $$F_{100I} = e^{2j[1+\cos(\phi)]}; \quad (10)$$

In general, we can conclude that the phase coding should perform better than the amplitude coding, and that multilevel coding should perform better than fewer (or binary) level coding.

Since other embodiments of the invention will become apparent to those skilled in the art, the scope of the invention is to be defined solely by the language of the following claims and art recognized equivalents.

What is claimed is:

1. Apparatus for performing one way image restoration of an image which is projected through a phase aberrating medium comprising:

(a) first beam projection means for projecting an object beam having a first polarization through the phase aberrating medium to produce a diffraction distorted image therein;

(b) second beam projection means for projecting a phase aberration measurement probe beam having a second polarization through the phase aberrating medium to produce a phase aberrated wavefront therein;

(c) beam separation means for separating the object beam from the probe beam;

(d) first imaging means for imaging the diffraction distorted image contained within said object beam upon an image receptor;

(e) second imaging means for imaging the phase aberrated wavefront contained within said probe beam upon an image sensor;

(f) interference pattern generation means for combining the probe beam with a reference beam for in turn producing an interference pattern upon the image sensor; and (g) phase encoding means, coupled between the image sensor and the image receptor, for producing a phase encoded signal upon the image receptor which compensates for part of the phase distortion of the phase aberrated wavefront in its first order approximation.

2. The apparatus of claim 1 wherein said beam separation means comprises a polarizing beam splitter.

3. The apparatus of claim 1 wherein said image receptor comprises a spatial light modulator.

4. The apparatus of claim 2 wherein said image receptor comprises a spatial light modulator.

5. The apparatus of claim 1 wherein said image sensor comprises a gray scale detector.

6. The apparatus of claim 2 wherein said image sensor comprises a gray scale detector.

7. The apparatus of claim 3 wherein said image sensor comprises a gray scale detector.

8. The apparatus of claim 4 wherein said image sensor comprises a gray scale detector.

9. The apparatus of claim 5 wherein said phase encoding means produces phase encoded signals that are a function of the light intensity sensed by the gray scale detector.

10. The apparatus of claim 7 wherein said phase encoding means produces phase encoded transfer function signals that are a function of the light intensity sensed by the gray scale detector.

11. Apparatus for performing one way image restoration of an image which is projected through a phase aberrating medium comprising:
  (a) first beam projection means for projecting an object beam through the phase aberrating medium for producing a diffraction distorted image therein;
  (b) second beam projection means for projecting a phase aberration measurement probe beam through the phase aberrating medium to produce a phase aberrated wavefront therein;
  (c) beam separation means for separating the object beam from the probe beam;
  (d) first imaging means for imaging the diffraction distorted image contained within said object beam upon an image receptor;
  (d1) second imaging means for imaging the phase aberrated wavefront contained in said probe beam upon an image sensor;
  (e) phase retardation sensing means for detecting local wavefront distortions produced by the phase aberrating medium; and
  (f) phase encoding means, coupled between the phase retardation sensing means and the image receptor, for producing a phase encoded signal upon the image receptor which compensates for part of the phase distortion of the phase aberrated wavefront in its first order approximation.

12. The apparatus of claim 11 wherein said beam separation means comprises a polarizing beam splitter.

13. The apparatus of claim 11 wherein said image receptor comprises a spatial light modulator.

14. The apparatus of claim 12 wherein said image receptor comprises a spatial light modulator.

15. The apparatus of claim 11 wherein said image sensor comprises a gray scale detector.

16. The apparatus of claim 12 wherein said image sensor comprises a gray scale detector.

17. The apparatus of claim 13 wherein said image sensor comprises a gray scale detector.

18. The apparatus of claim 14 wherein said image sensor comprises a gray scale detector.

19. The apparatus of claim 15 wherein said phase encoding means produces phase encoded signals that are a function of the light intensity sensed by the gray scale detector.

20. The apparatus of claim 17 wherein said phase encoding means produces phase encoded transfer function signals that are a function of the light intensity sensed by the gray scale detector.

21. Apparatus for performing one way image restoration of an image which is projected through a phase aberrating medium comprising:
  (a) first beam projection means for projecting an object beam through the phase aberrating medium for producing a diffraction distorted image therein;
  (b) second beam projection means for projecting a phase aberration measurement probe beam through the phase aberrating medium to produce a phase aberrated wavefront therein;
  (c) beam separation means for separating the object beam from the probe beam;
  (d) first imaging means for imaging the diffraction distorted image contained within said object beam upon an image receptor;
  (d1) second imaging means for imaging the phase aberrated wavefront contained in said probe beam upon an image sensor;
  (e) local wavefront sensing means for detecting optical path length distortions produced by the phase aberrating medium; and
  (f) phase encoding means, coupled between the local wavefront sensing means and the image receptor, for producing a phase encoded signal upon the image receptor which compensates for part of the phase distortion of the phase aberrated wavefront in its first order approximation.

* * * * *